June 6, 1939.  R. LEWIS  2,161,361
COMBUSTION CONTROL
Filed July 21, 1936  5 Sheets-Sheet 1

Inventor
ROBERT LEWIS
By Semmes & Semmes
Attorney

June 6, 1939.   R. LEWIS   2,161,361
COMBUSTION CONTROL
Filed July 21, 1936   5 Sheets-Sheet 3

Inventor
ROBERT LEWIS
By Semmes & Semmes
Attorneys

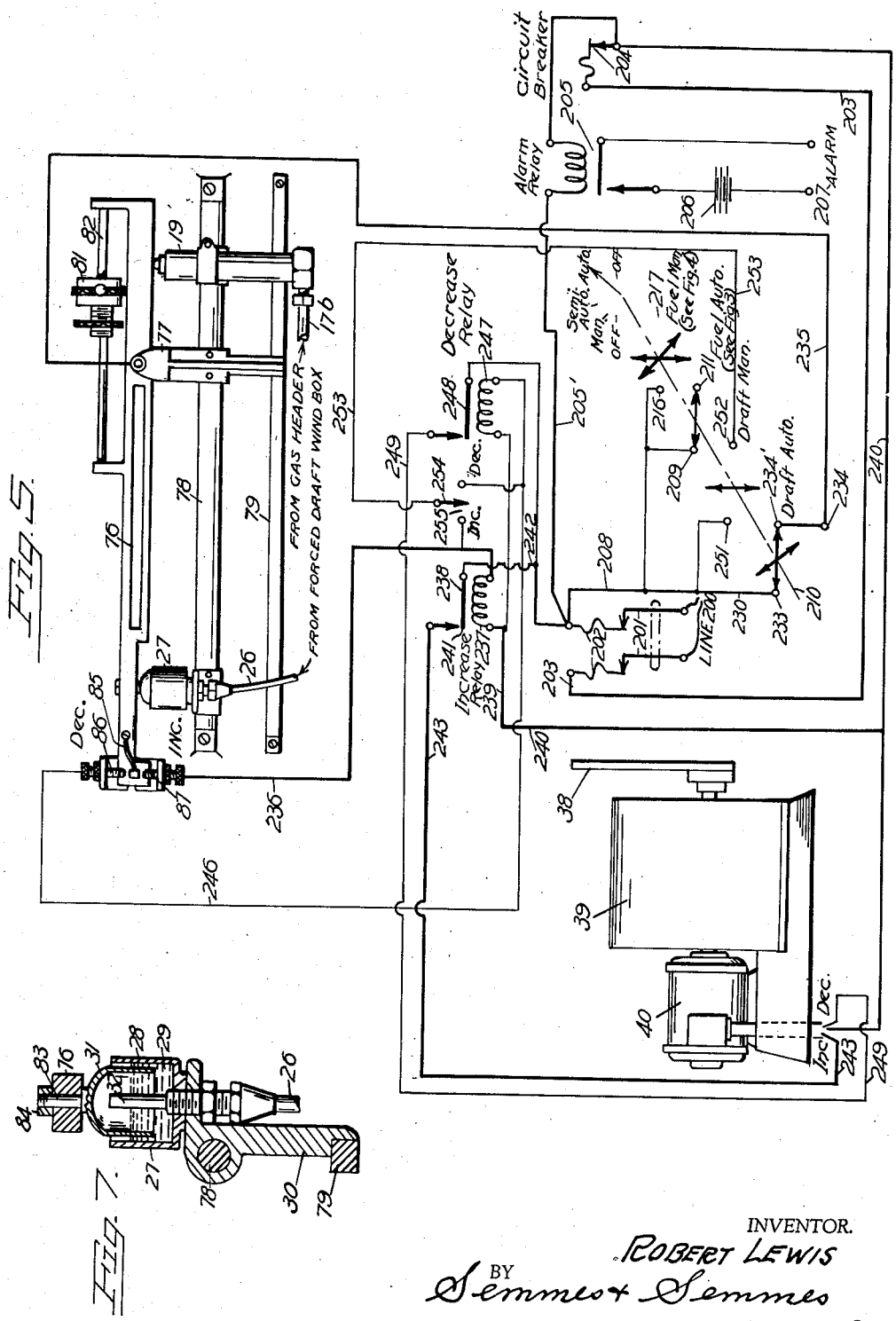

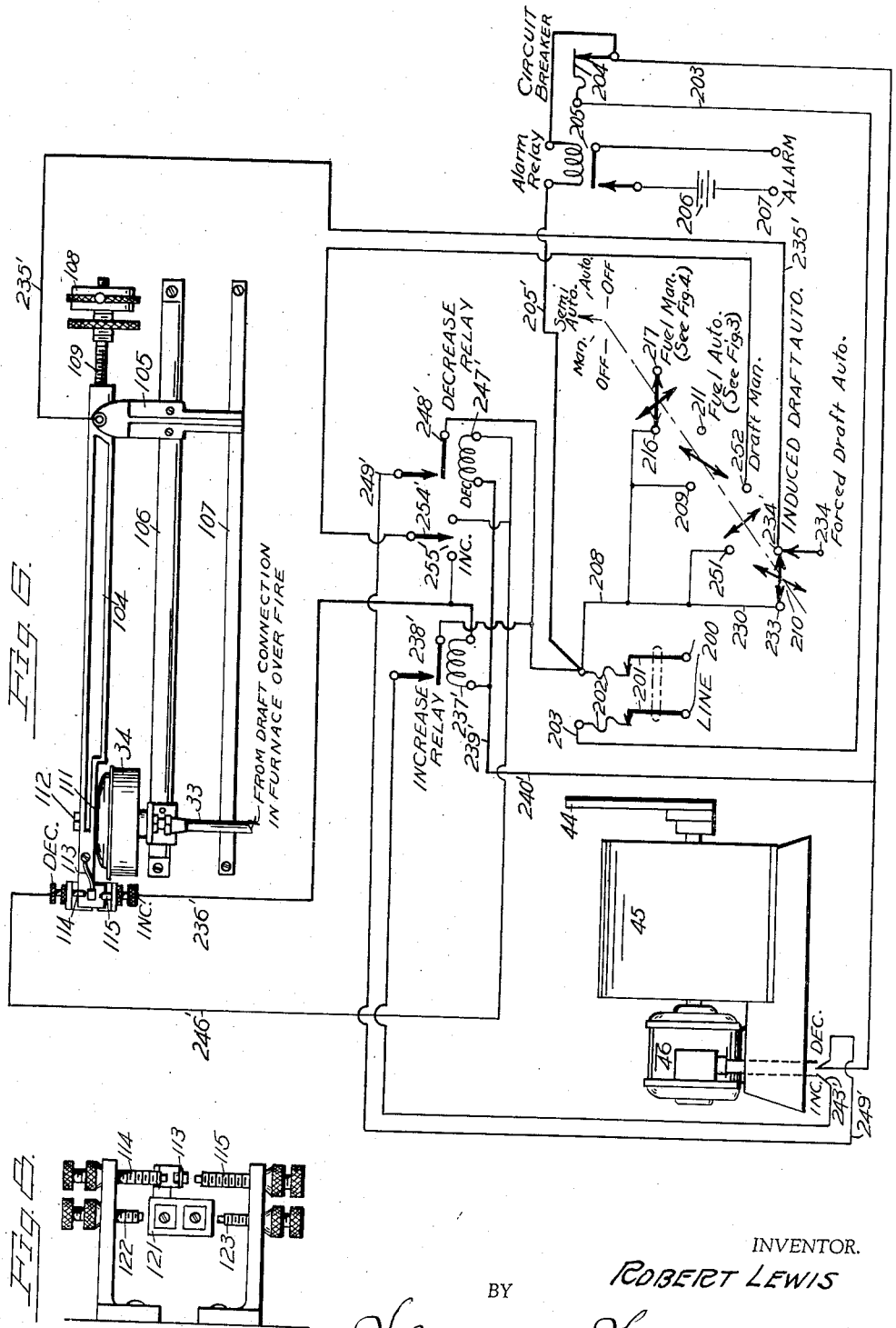

Patented June 6, 1939

2,161,361

UNITED STATES PATENT OFFICE 2,161,361

COMBUSTION CONTROL

Robert Lewis, Denver, Colo., assignor to The Denver Fire Clay Company, Denver, Colo., a corporation of Delaware Application July 21, 1936, Serial No. 91,754

2 Claims. (Cl. 236—14)

This invention relates to control devices, and more particularly has reference to a method and apparatus for controlling the rate and efficiency of combustion in a furnace. While by no means limited to the boiler field, it will be described with reference to power or heating boilers which operate under forced and induced draft, or under forced and natural draft.

Prior devices and methods of this general character have been open to serious objection. In the first place, many of the devices heretofore used have been of the so-called "positioning" type, in which the various valves are set in definite positions in accordance with the steam pressure, and in which, after the valves are adjusted in any given position, there is no compensation for any change in air or fuel pressure.

Even in the so-called "proportioning" controls, in which the actual amounts of air and fuel fed to the furnace are attempted to be proportioned to the steam demand, there reside certain disadvantages. In general, these last types of controls do not operate to effect optimum economies of fuel, due to their principle of construction and operation, and particularly because there is a time lag between any variation in the control factors and the actual change in the element controlled. Furthermore, the prior controls have been relatively expensive to manufacture and rather difficult to operate.

To overcome the above objections is one of the objects of my invention.

Another object is to provide a device and method whereby fuel and air are supplied to a furnace in a definite ratio to each other to secure maximum combustion efficiency, and in which the rate of combustion is proportional to a condition of the medium being heated.

Yet another object is to provide a control by which fuel is fed to a furnace in accordance with a condition of the heated medium, a forced draft is maintained in a definite ratio to the fuel feed, and the pressure within the combustion chamber is maintained substantially constant.

A still further object is to provide specific means for achieving the foregoing objects.

It will of course be appreciated that the specific form of apparatus disclosed in the drawings and described herein is susceptible of various modifications, but the basic concept of my invention embraces an increase or decrease in the fuel supply as the necessity for combustion increases or decreases, and the maintenance of the proper amount of air in the combustion chamber to insure optimum combustion efficiency. More specifically, I contemplate a balancing of the amount of fuel fed to the furnace with a condition of the heated medium, a balancing of the fuel feed with the intensity of a forced draft, and the maintenance of a substantially uniform pressure in the combustion chamber.

In the accompanying drawings depicting one specific embodiment of my invention, and in which corresponding numerals refer to the same parts:

Figure 5 is a detailed view of the forced draft control beam and its associated circuits, and showing the beam in circuit closing position to increase the forced draft;

Figure 6 is a view of the combustion chamber control beam or stack damper control beam, and its associated circuits showing both circuits open;

Figure 7 is a vertical sectional view of the manometer actuated by the pressure in the forced draft wind box;

Figure 8 is a detailed view of the preferred arrangement of contacts for the forced draft control beam and stack damper control beam.

Figure 1:
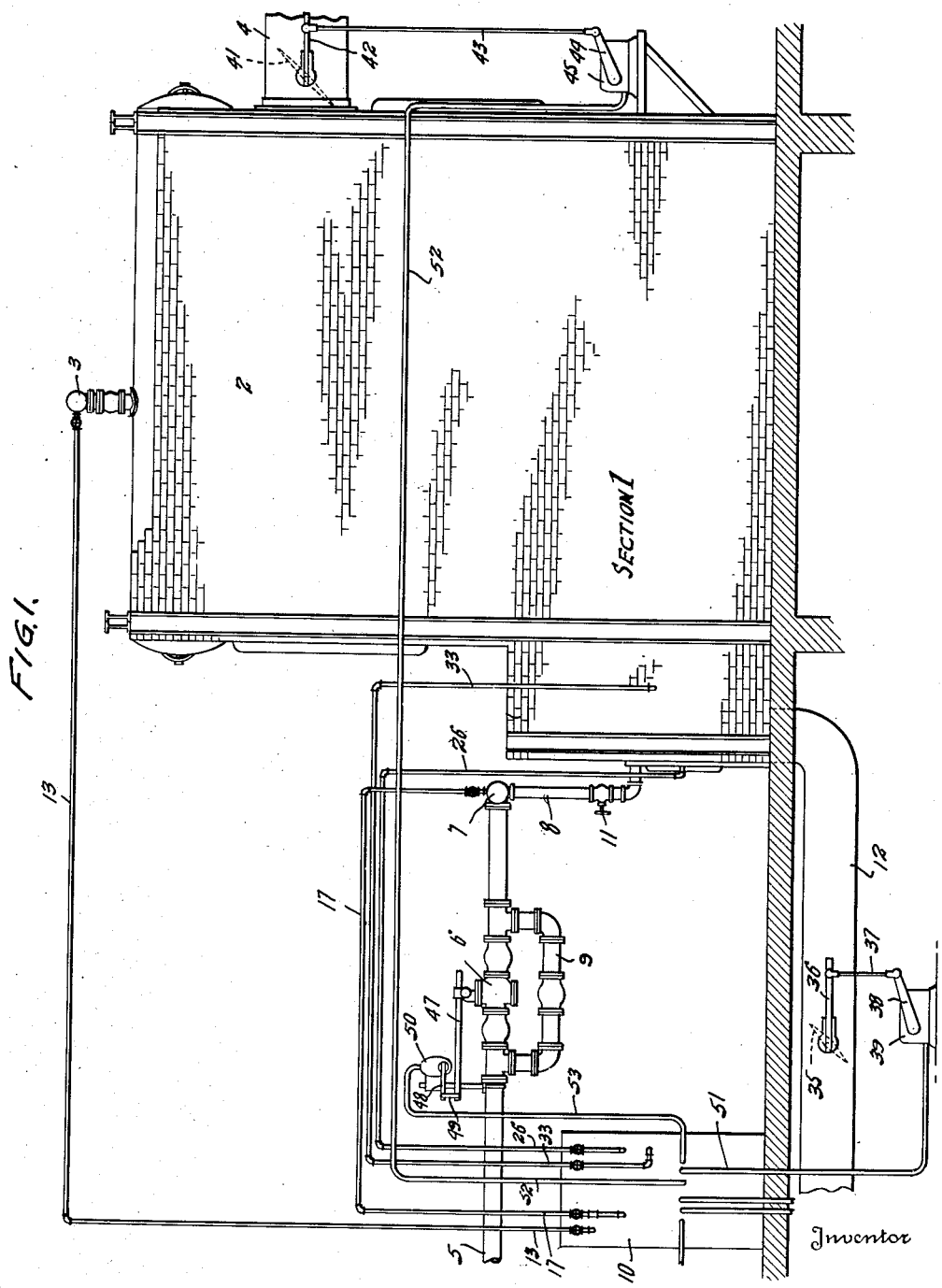
Figure 1 is a side view of my invention applied to a conventional boiler.

This invention is generally similar to the invention disclosed in my copending application, filed November 18, 1932, Serial No. 643,231, now Patent No. 2,049,707, and finds particular application in the case of a furnace operated under forced and induced draft or under forced and natural draft.

It will be observed that in the specific embodiment illustrated in the drawings, an application of this invention to a furnace in which the fuel is in gaseous form has been shown, and in which the control factors are: the pressure of the steam in the steam header, the pressure of the fuel in the fuel header, the pressure in the forced draft wind box, and the pressure in the combustion chamber of the furnace.

It will be readily appreciated, however, in view of the prior art, and particularly in view of the disclosure of my above-mentioned co-pending application, that the specific apparatus herein disclosed may readily be modified for use in a solid fuel or liquid fuel furnace; and that the fuel control may be governed by the temperature, or flow, or liquid level of the heated medium, or any other condition thereof; that some condition of the fuel feed other than the fuel header pressure may be substituted; and furthermore, the forced draft factor may be some condition other than the pressure within the forced draft wind box, such as, for instance, the velocity of air flow.

It will also be noted that the invention is shown as applied to a forced and natural draft model, but it will of course be apparent that it may be used with equally beneficial results in a forced and induced draft furnace. Various other modifications or applications of the invention will suggest themselves to persons skilled in the art, and it is to be distinctly understood that I am to be bound merely by the scope of the appended claims.

Referring particularly to Fig. 1, there is disclosed a furnace provided with a combustion chamber section 1 and a boiler section 2. Steam is withdrawn from the boiler by means of a steam header 3, and the flue gases pass through a furnace outlet 4 to a stack, not shown.

As stated above, the particular embodiment disclosed in the drawings shows a furnace operated by a gaseous fuel which is supplied by a suitable main 5. The fuel passes through a control valve 6 into a manifold 7, and then by line 8 to the burner orifice (not shown) in the combustion chamber. A valved by-pass 9 may be provided around control valve 6. Also, a manually operable valve 11 may be inserted in the line 8 to regulate or shut off the particular burner supplied by such line.

Of course the furnace may be provided with a plurality of burners all fed by the manifold 7. It should also be pointed out that the invention may be applied to a battery of boilers, as for example, when such batteries receive their fuel through a common control valve 6, discharge the flue gases into a common breeching, and a forced draft is supplied through a common wind tunnel. In such event, however, it is usually necessary to provide suitable valves and dampers to maintain the proper ratio between the fuel and the air supplied to, and the flue gases exhausted from, the several furnaces, or by providing other control elements to regulate such factors individually or in groups. When such valves and dampers are initially set, the battery is then operated as a unit by the control shown in the drawings.

The air supporting combustion is furnished by a forced draft which passes through a wind tunnel 12 extending up to a forced draft wind box and thence through the burner (not shown) to combustion chamber 1. The forced draft fan is not shown in the drawings, and a conventional type of fan may be employed which may be driven by electricity, steam, or other appropriate power.

Figure 2:
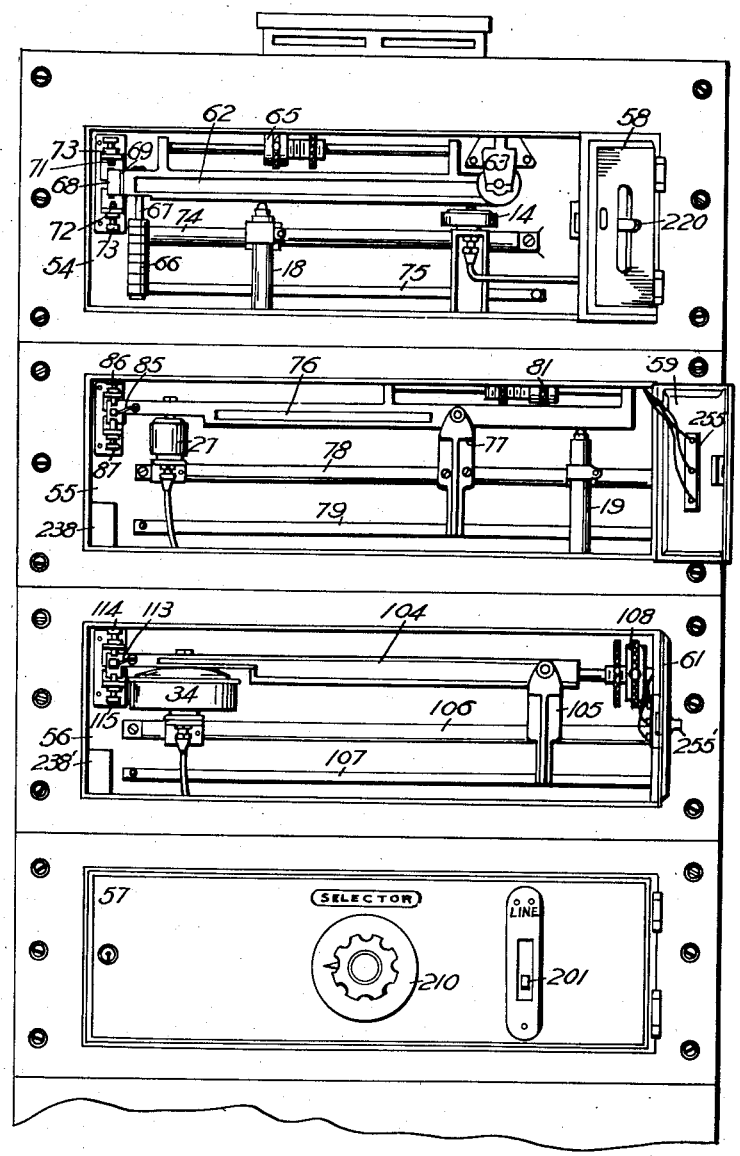
Figure 2 is a fragmentary detailed view in elevation of the front of the control cabinet, showing the respective pivoted beams.
Figure 3:
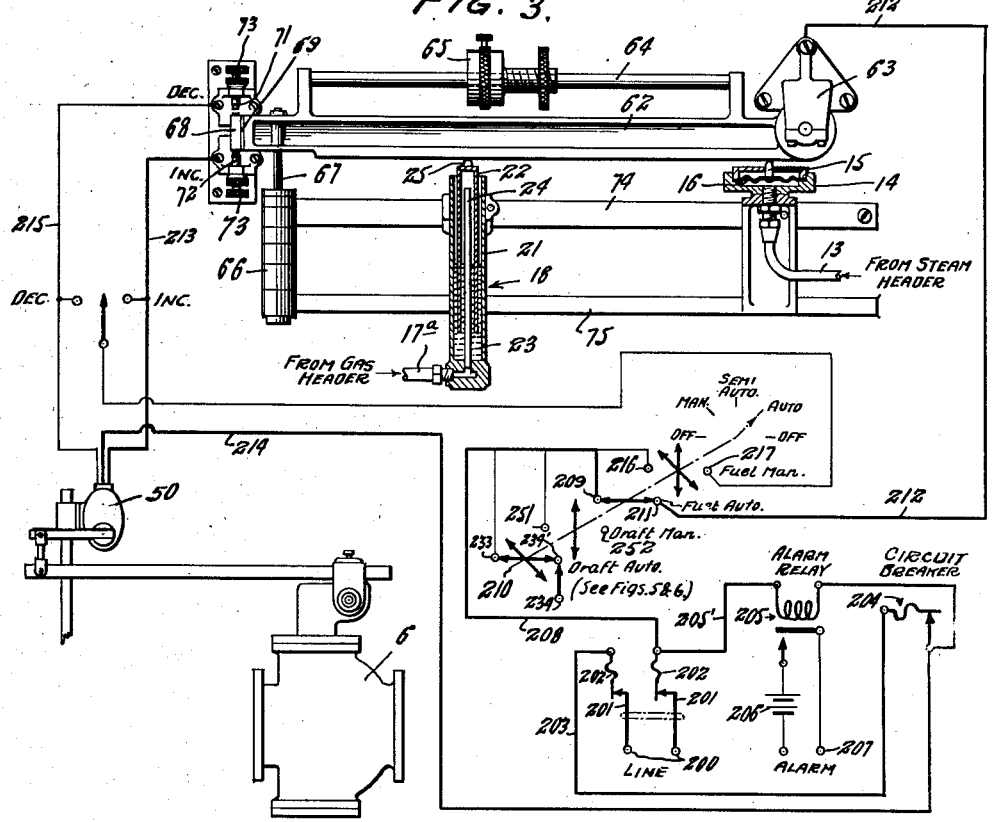
Figure 3 is a detailed view of the fuel control beam and its associated elements, and a diagrammatic sketch of the circuits for the control of the fuel feed, showing in heavy lines the automatic circuit closed to increase the fuel supply.
Figure 4:
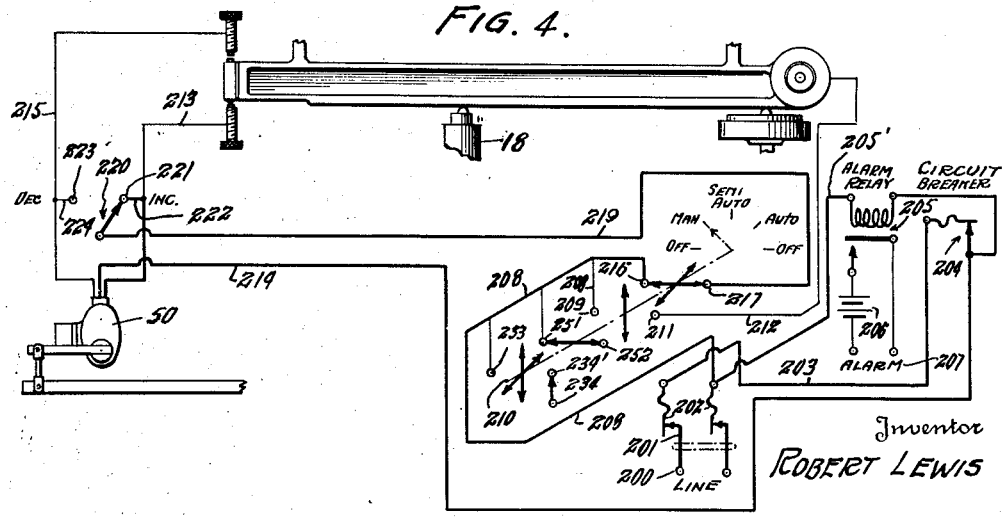
Figure 4 is a view of the same beam, but showing the circuits for manually controlling the supply of fuel.

There is tapped into the steam header 3, a steam line 13 which extends to the control cabinet and which terminates in a conventional diaphragm manometer 14 as disclosed in Figures 2 through 4. In this element a lug 15 is mounted upon the diaphragm 16, and is adapted to move upwardly with an increase in the steam pressure within the boiler and to move downwardly with a decrease in the boiler pressure. While the line 13 is shown tapped into the steam header 3, it will of course be appreciated that this line may be tapped into the boiler tubes proper. Also, as stated above, some other condition of the heated medium may be the control factor, such as demand, rate of flow, temperature, liquid level, etc.

The line 17 is tapped into the fuel header 7 and likewise extends to the control cabinet 10. Within the control cabinet, and not shown in the drawings, the line 17 is split to form two lines 17a and 17b, which extend to two manometers 18 and 19, respectively, as disclosed in Figures 2 through 5.

As best shown in Figure 3, the manometers are made up of a casing 21, open at the upper end. An inverted casing 22 slidably fits within the casing 21, and a body of mercury 23 is provided to form a liquid seal. Of course, any other suitable sealing liquid may be employed. The line 17a or 17b is tapped into the base of the casing 21 and by means of a tube 24 communicates with the interior of casing 22 above the level of the mercury 23. A knob 25 is provided on the top of casing 22. It will be observed that the buoyancy of casing 22 is a function of the pressure inside of the casing 22, which of course is the pressure of the fuel in the header 7.

A line 26 is tapped into the forced draft wind box near the burner. The line 26 extends to the control cabinet 10 and is joined to a manometer 27 which, as best shown in Figure 7, is made of a casing 28 containing a body of mercury 29 as a sealing medium. The casing 28 is carried by a bracket 30, and floating in the mercury is an inverted bell member 31. A tube 32 is threaded in the discharge end of the line 26 and extends through the casing 28 and mercury seal 29 into the upper reaches of bell 31. It will therefore be noted that the pressure existing in the wind box is transmitted to the interior of the bell 31, and that the bell 31 thereby exerts a buoyant tendency varying with the pressure in the wind box.

A line 33 extends from the combustion chamber to the control cabinet 10 and is tapped into the bottom of a manometer 34 which may be constructed in accordance with the principle of manometer 27. It will be appreciated that, in accordance with the present theory of boiler operation, the pressure within the combustion chamber is preferably (though not necessarily) a negative pressure, less than atmospheric, whereas the steam pressure, the fuel pressure and the forced draft wind box pressures will be all positive. Nevertheless all of the manometers 14, 18, 19, 27 and 34 will exert forces which will vary with the respective pressures to which they respond.

There is positioned in the forced draft wind tunnel 12 a damper 35 provided with an arm 36. A link 37 extends from the arm 36 to a crank 38. The crank 38 is driven, through suitable reduction gearing 39, by a reversible motor 40. Therefore the motor may be operated to open or close the damper and, in view of the fact that the pressure in the combustion chamber is substantially constant, the regulation of the damper effects a control of the amount of air admitted to the furnace to support combustion. See in addition, Figures 5 and 6 for illustration of the motors 40 and 46.

It will be appreciated, of course, that this control of the combustion supporting air may be accomplished by varying the speed of the forced draft fan motor (not shown), and such a modification is of course within the contemplation of this invention. In such event, the motor 40 and arm 38 might regulate a rheostat to control an electric motor for the forced draft fan, or to operate a valve or other control means for a steam or other type motor for the forced draft fan.

In the furnace outlet 4 there is positioned a damper 41 provided with an operating arm 42. A link 43 connects arm 42 with a crank 44. The crank 44 likewise is operated, through suitable reduction gearing 45, by a reversible electric motor 46. Therefore damper 41 is controlled by the operation of motor 46.

While not shown in the drawings, it will of course be appreciated that the furnace pressure may be controlled by the use of an induced draft fan. When such a fan is employed, its speed may be varied to control the furnace, or the fan may be run at a constant speed and the furnace pressure controlled by a damper on either the inlet or outlet side of such fan.

The valve 6 in the fuel feed line is provided with an arm 47 which in turn is operated by crank 48 through a link 49. The crank 48 is rocked by a reversible motor 50 which is also provided with suitable reduction gearing. The motors 40, 46 and 50 are all provided with adjustable limit switches (not shown).

A conduit 51 carries from the control cabinet the wires for the circuit of motor 40; conduit 52 carries the wires for motor 46 and conduit 53 carries the wires for motor 50.

Referring particularly to Figure 2, it will be noted that the control cabinet 10 is provided with four compartments, 54, 55 and 56, and a switch and terminal compartment which is shown as closed by a door 57. Compartments 54, 55 and 56 are provided with doors 58, 59 and 61, which are normally closed.

In compartment 54 there is located a so-called fuel control beam 62 which, as best shown in Figure 3, is pivotally mounted in anti-friction bearings on a bracket 63. The beam 62 is provided with a rail 64 on which is slidably mounted a weight 65. Furthermore, weights 66 are carried by the beam 62 by means of a depending rod 67.

The beam 62 carries a conductor (not shown) which is connected to a contact block 68, insulated from the beam proper by suitable material 69. The beam 62 is adapted to be balanced between, or to oscillate between, two stationary contacts 71 and 72, which are adjustably spaced by means of set screws 73. The extent of movement of beam 62 between the stationary contacts 71 and 72 may therefore be varied.

Manometers 14 and 18 are carried by a rail 74 mounted within compartment 54, and a guide rail 75 also provides further support and maintains the manometers vertically disposed. Manometers 14 and 18 are adjustable longitudinally upon the rail 74.

It will be noted, therefore, that both the weights 65 and 66 and the relative positions of manometers 14 and 18 are adjustable. The spacing of manometers 14 and 18 determines the ratio between variations in the steam pressure and the rate at which fuel is supplied the furnace; and weights 65 and 66 are for the purpose of maintaining a balance of the beam at the particular pressure decided upon. For instance, if it is desired to increase the operating pressure in the boiler, weight 65 may be moved to the left in Figure 3 or additional weights may be imposed upon depending rod 67; or if these are not sufficient, then manometer 14 is moved to the right on rail 74, and manometer 18 is readjusted.

In operation the various elements are so adjusted that the beam 62 is balanced between contacts 71 and 72 for a given boiler pressure. When so adjusted the fuel is being fed at just the rate to maintain the desired boiler pressure. If the pressure drops below the determined amount, the force exerted by lug 15 of manometer 14 against the beam 62 will be decreased, and the beam will drop so that contacts 68 and 72 are closed. This serves to operate motor 50 in a direction to further open fuel valve 6. This results first in an increased pressure within the fuel header 7, and then the increased combustion effects an increased generation of steam which will either return the pressure to the desired point, or compensate for the increased demand on the boiler, or both. However, upon an increase in the pressure of fuel in header 7, resulting from the opening of valve 6, the force exerted by manometer 18 is increased, throwing the beam back into balance and stopping any further opening of the valve.

Assuming that the pressure in the boiler exceeds the desired pressure (either from a decrease in demand, or from the just-described operation), the increased force exerted by manometer 14 will throw the beam 62 out of balance and engage contact 68 with contact 71. This will reverse motor 50 to decrease the flow through valve 6. The reduction in fuel flow causes a decrease of pressure in fuel manifold 7, and consequently a reduction in the force exerted by manometer 18. Inasmuch a beam 62 is supported by the combined forces of manometers 14 and 18, the circuit between contacts 68 and 71 will be thereby broken, and the beam returned to a balanced position intermediate contacts 71 and 72.

As best shown in Figure 5, a beam 76 is located in compartment 55 and is mounted on a standard 77 by means of anti-friction bearings. The standard 77 is carried by rod 78 which also supports manometers 19 and 27. A guide rail 79 is likewise provided, and, as in the case of the fuel control beam, the fuel pressure manometer 19 is adjustable upon rod 78 in order to maintain the desired ratio between the fuel feed and the air input to the furnace. A weight 81 is adjustable upon a rod 82 carried by the beam, and serves to balance beam 76 between adjustable contacts 86 and 87.

It will be observed that the manometers 19 and 27 are disposed on opposite sides of the fulcrum point of beam 76, and it will also be noted that the manometer 27 is positively joined to the beam by means of a screw 83 extending from the inverted bell 31 through a slot in the beam and a nut 84 threaded thereon.

Beam 76 carries a conductor (not shown) which is connected to a spring contact 85. Beam 76, when the furnace is operating for a period with a given fuel input, is adapted to be balanced so that contact 85 lies intermediate the adjustable contacts 86 and 87.

Beam 76 controls the circuits of the damper motor 40 and thereby serves to regulate the forced draft. Assuming that the supply of fuel has been increased by virtue of a drop in steam pressure in the boiler, the fuel pressure in fuel manifold 7 is thereby increased. Such increased pressure is transmitted through lines 17 and 17b to manometer 19, which thereupon exerts a greater force on beam 76 in a counter-clockwise direction. Therefore a circuit between contacts 85 and 87 is established which operates motor 40 in one direction to open damper 35. Upon opening of damper 35 the pressure within the forced draft wind box 12 is increased, and thereby manometer 27 increases its force upon beam 76 tending to re-establish the balance of the beam between contacts 86 and 87. The operation of the forced draft unit upon a decrease in fuel pressure will be equally apparent.

Within the compartment 56 (Figures 2 and 6) of control cabinet 10 there is located a beam 104 which controls stack damper 41 and consequently the pressure existing within the combustion chamber. This beam is mounted on anti-friction bearings in a standard 105 which in turn is mounted upon a rail 106. A guide rail 107 is likewise provided to effect additional support. A weight 108 is mounted on a projection 109 from the beam, and is longitudinally adjustable on such projection to secure the necessary balance of the beam under operating conditions.

The manometer 34 is mounted upon the rail 106, and is secured to the beam 104 by means of a lug 111 and nut 112. The manometer 34 is of generally similar construction to manometer 27, but is somewhat larger in view of the fact that it operates at a lesser pressure. Also the sealing medium employed in manometer 34 may be oil instead of mercury, as in the case of manometer 27.

The beam 104 is likewise provided with a conductor (not shown) and with a flexible contact 113. When the beam is in balance this contact lies intermediate adjustable contacts 114 and 115. When the beam is thrown out of balance, one or the other of contacts 114 and 115 is contacted by contact 113.

Upon any increase in the combustion chamber pressure, the manometer 34 causes beam 104 to make a contact between contacts 113 and 114. The circuit so established causes motor 46 to open damper 41 to thereby lower the pressure in the combustion chamber.

Upon a decrease below the normal of the combustion chamber pressure, contacts 113 and 115 will engage to operate the motor 46 in a reverse direction to close damper 41. Upon closing of the damper the pressure in the combustion chamber will increase until the normal pressure is again attained.

It will be noted that the beam 104 serves to maintain the pressure in the combustion chamber substantially constant, and thereby prevents the infiltration of unrequired air. The exact pressure to be maintained is determined by the position of weight 108. While there are various factors (such as variations in the forced draft, changes in the direction and velocity of the wind and atmospheric changes) which constantly tend to vary the combustion chamber pressure, such variations in these factors are immediately compensated for by the beam 104 and its associated mechanism, and for all practical purposes the combustion chamber pressure remains constant.

In the control cabinet compartment closed by the door 57 may be located the terminal strips for the various electric connections, as well as certain safety devices such as a thermal overload circuit breaker to quickly open all control circuits and thereby stop the operation of the control, in the event that any element of the device becomes stalled or overloaded. If this circuit breaker opens, the fuel valve and dampers remain in the last position of adjustment, and an alarm may be provided to notify the operator that the circuit has been broken. This alarm may be of any suitable type, visual or audible, or both, and should, of course, be operated by an independent current source so that it will also warn the operator if the electric power for the instrument fails.

The door 57 may carry the main line switch 201, preferably of a thermal overload type, and also a selector switch 210. The selector switch may be provided with four positions—"off", "manual", "semi-automatic", and "automatic".

In the "off" position of the selector switch, none of the circuits in the instrument is energized, and there is possible neither an "automatic", "semi-automatic", or "manual" control of the furnace from the control cabinet.

When the selector switch is in the "manual" position the circuits controlled by the beams 62, 76 and 104 are not energized. However, the fuel control valve, the forced draft damper, and the induced draft damper may be manually operated from the control cabinet. On door 58 is located a switch 220, on door 59 is located a switch 255, and on door 61 is located a switch 255'. These switches provide for the manual control of valve 6, and dampers 35 and 41, respectively. The button of each switch is resiliently mounted to normally remain in the "off" position, but may be pivoted in one or the other direction to actuate the motors 50, 40 and 46 in a forward or reverse direction.

When the selector switch is in the "semi-automatic" position, the circuits controlled by the beams 76 and 104 are energized, but the motor 50 remains under manual control. By this means the operator may manually control the generation of steam, by regulating the feed of fuel, but the amount of air admitted to the furnace through the forced draft wind tunnel will be automatically controlled in accordance with the fuel supply, and also the combustion chamber pressure will be automatically maintained constant. The manual and semi-automatic operation of the unit is particularly helpful when starting up a cold boiler and bringing the plant up to normal operating conditions. By the manual switches 220, 255 and 255', the valve 6 and dampers 35 and 41 may be adjusted to the desired positions prior to lighting the burners, and then when the burners are lighted, the selector switch may be turned to the "semi-automatic" position. The operator then controls the combustion to get the steam to the proper pressure, at which time the selector switch may then be rotated to the automatic position.

When the selector switch is turned to the "automatic" position, each of the circuits controlled by the beams 62, 76 and 104 is energized and thereby the unit operates to fully and automatically operate the furnace.

A modified arrangement for the contacts of beams 76 and 104 is shown in Figure 8, which, as a matter of fact is preferable in view of the added safety factor. It will be appreciated that the contacts are liable to accumulate dirt or become worn out, and in Figure 8 I have shown two sets of contacts for use with each of the beams 76 and 104, and, if desired, may be employed with beam 62.

I shall describe the figure with reference to beam 104, it being understood however that the arrangement on beam 76 may be identical. In addition to the spring contact 113, which is adapted to engage screw contacts 114 and 115, I provide a block 121 which is insulated from the main body of beam 104, and which forms in effect a beam contact. This block is connected to the conductor (not shown) of beam 104, to which the flexible contact 113 is likewise connected. The block 121 is adapted to engage contacts 122 and 123, which it will also be noted are adjustable.

The contacts 114, 115, 122 and 123 are so adjusted that upon oscillation of beam 104 contact 113 will first engage either contact 114 or 115. However, a slightly further movement of beam 104 will serve to bring block 121 into engagement with either contact 122 or 123, the flexible contact 113 bending during such increased movement. It will therefore be seen that contact 113 is the one which will normally establish the desired circuit, but if this contact should become dirty, worn, or out of adjustment, contact block 121 assures an establishment of the desired circuit. Both contacts 114 and 122 are connected to line 246', while contacts 115 and 123 are both connected to line 236', such lines being hereafter referred to in more detail.

While the type of electric circuits for use in this device will of course be optional, in Figures 3 through 6 specific circuits have been shown which may be employed for the individual control elements. In these figures the circuits which are shown as closed, are indicated by heavy lines, while the open circuits appear in lighter lines.

It will be noted that with respect to the circuits for the forced draft and induced draft control motors, relays are preferably employed so that the load on the actual circuits which are opened and closed by the beam contacts 85 and 113 may be kept small. This, of course, insures longevity of these contacts.

In Figure 3, current flows from a source of current 200, marked "line" on the drawings, through the thermal overload switch 201 provided with fuses 202, through a conductor 203 to the thermal overload circuit breaker 204. From the circuit breaker 204 current flows through the solenoid of an alarm relay 205 and thence back to the line switch 201 through conductor 205'. The circuit just described is of course normally closed during the whole time that the switch 201 or the circuit breaker 204 is in the "On" position. The alarm relay 205 is adapted to actuate upon failure of line current or breaking of the circuit by the circuit breaker 204. When the alarm relay closes, it closes a circuit from a separate source of current, such as a wet or dry battery 206, to operate an alarm 207, which, as above stated, may be of the visual or audible, or both, type.

From the line switch 201, current also flows through a conductor 208 to a contact point 209 of the selector switch 210. As pointed out above, manipulation of this selector switch is adapted to close circuits for various operations such as manual, semi-automatic, and automatic. In Figure 3, the circuit is closed between contact point 209 and a contact point 211 to establish the automatic circuit. Current from there flows through conductor 212 to the contact 68 on beam 62.

As shown in Figure 3, the steam pressure has dropped, due for example to additional load, and contact is established between contacts 68 and 72. The current then flows through conductor 213 to the winding of the motor 50, which will operate to open the fuel valve 6. From the motor it flows through line 214 to circuit breaker 204 and thence back to the line 200. Should any additional load of current occur in this circuit, the breaker 204 will operate to break the circuit and thereby sound the alarm 207.

The above described circuit is shown in this figure in heavy lines, and this circuit increases the amount of fuel fed to the furnace. Assuming that the beam 62 is in balance, should the steam pressure in the boiler rise above its predetermined pressure, the circuit will be as just described except that the current will flow from contact 68 through contact 73, as shown by the light line 215, to the other winding of the motor 50. This of course will operate the motor in a reverse direction to close the fuel valve 6.

Should it be desired to manually control the fuel feed, the selector switch 210 is manipulated to the "manual" position shown in Figure 4, closing circuit through contact points 216 and 217. As above mentioned, the fuel feed is manually controlled when the selector switch is in either "manual" or "semi-automatic" positions. Current then flows from the line switch 201 through conductor 208, bridged contacts 216 and 217, and conductor 219 to the blade of the manual switch 220. This switch may then be thrown to operate the motor 50 either to open or close the fuel valve 6. As shown in the heavy lines of Figure 4, the circuit is closed to the "increase" contact point 221 of switch 220, the current flowing through conductors 222 to the forward winding of motor 50.

To reverse the motor, the blade of the switch 220 is thrown to close contact to the "decrease" point 223, current then flowing through lines 224 to the reverse winding of the motor.

It will be noted that even when the fuel valve motor 50 is manually operated, the alarm relay and breaker circuit still remains normally closed. This is a single circuit of course for the entire control, and, while I have shown it in connection with each of the several wiring diagrams of Figures 3 through 6, I will not repeat its description.

Figure 5 shows schematically the circuit for operating the forced draft damper. In this figure, current flows from the line switch 201 through conductors 208 and 230 to contact point 233 of the selector switch 210. In this figure the selector switch is shown as in the automatic position, current flowing through to contact point 234' and thence to 234. From there it flows through line 235 to the beam 76. As above discussed, this beam is adapted to be rocked by variations in fuel pressure, and, as shown in this figure, the fuel pressure is above normal, throwing contact 85 into engagement with contact screw 87. The current then flows through line 236 to the solenoid 237 of a relay 238 (legend on the drawing "increase relay"). These relays are employed, as above pointed out, for the purpose of avoiding heavy loads through the beam contacts. The relays may be located in the compartments of their respective beams, or they may be mounted on the inside of the compartment doors.

From the relay solenoid 237, the current flows back to the power line through lines 239 and 240, circuit breaker 204 and line 203.

When the solenoid 237 is energized, the armature 241 of the relay closes contact between the line 242, connected with the line switch 201, and a conductor 243 which leads to the "increase" winding of the motor 40 which operates to open the forced draft damper 35. From this winding, current flows back to the source of current through lines 240 and 203.

Should the feed of fuel be decreased, or perchance the forced draft exceed its ratio to the fuel feed for some reason, the beam 76 moves so that contact 85 engages contact 86. The circuit so established is in part identical with the circuit just described with the following exceptions: From contacts 85 86 the current passes through line 246 to solenoid 247 of the "decrease" relay 248, thence through line 239, to lines 240 and 203 to the line switch 201. Energization of solenoid 247 establishes a circuit which passes from the switch 201 through line 242 to the armature of the relay 248. From the armature the current passes through the line 249 to the "decrease" winding of motor 40, and thence back by way of lines 240 and 203 to switch 201. This serves to close the damper 35 to reduce the forced draft.

Should manual operation of the forced draft damper be desired, selector switch 210 is rotated to the "manual" position. This serves to close a circuit through contact points 251 and 252 of the selector switch, the current then flowing from line 208 through line 253 to the blade 254 of the manual switch 255. It will be observed that this switch may be operated to continue the circuit through coil 237 of relay 238, or to coil 247 of relay 248; and thence, in either event, returning to the switch 201 by way of lines 239, 240 and 203. Obviously, the manual actuation of one or the other relay establishes the respective motor operating circuits as described above.

In Figure 6 there is disclosed a diagram of the circuit which may be employed with the stack damper control beam. This circuit is similar to that shown in Figure 5, except merely that the selector switch 210 is here shown in "semi-automatic" position. In the "semi-automatic" position of the selector switch, the necessary contacts are closed to automatically operate both the forced draft and stack dampers, as above mentioned, and to permit of manual operation of the fuel valve.

However, the circuit which operates the stack damper motor 46 is similar to that shown in Figure 5, and therefore the same numbers, primed, are applied to this figure. It is not believed necessary, therefore, to repeat the description of the circuit, which is set forth above in connection with Figure 5.

While this invention has been described with respect to a single furnace, it will be appreciated that it may be applied to a battery of furnaces. As heretofore pointed out, it may readily be applied to a battery of boilers which receive their fuel through a common control valve, air through a common wind tunnel, and which discharge their flue gases into a common breeching. In such event the manometer 14 will be responsive to the boiler pressure in the common header from the battery of boilers or the pressure in one boiler which might be selected as a pilot for the battery. The manometers 18 and 19 will be responsive to the fuel pressure in the fuel header; the manometer 27 would be responsive to the pressure of the forced draft; and the manometer 34 may respond to pressure in any one of the furnaces serving as a pilot. As pointed out, with such an arrangement proper valves and dampers are employed to maintain the desired ratio between the quantities of fuel and air supplied to the respective furnaces and the flue gases exhausted therefrom.

In the event that the boilers of a battery should receive their fuel supply through separate control valves, separate fuel control beams should be provided which would be responsive to the steam pressures of the boilers and their respective fuel pressures. Likewise, if the boilers of the battery should receive their supply of air from separate wind tunnels, then separate forced draft control beams should be provided, such beams being responsive to the fuel pressures and forced draft pressures of the respective boilers. And finally, if the boilers of the battery discharge into separate stacks, separate beams responsive to the pressures in the respective furnaces should be provided to control the dampers in the stacks.

From the foregoing it will be observed that an instrument is provided for controlling combustion which operates on a principle of balancing various factors against one another. These factors are the pressures of the several control factors—the heated medium, the fuel, the combustion-supporting air, and the pressure in the combustion chamber. The change in the pressure of any one of these factors disturbs the balance of the several control beams which instantly readjust the valves and dampers to re-establish the ratios between the several pressures.

For instance, upon any variation in the steam pressure in the boiler, there is an immediate change in the rate at which fuel is supplied, and this change in fuel feed in turn instantly changes the forced draft to maintain the ratio between fuel and air to insure maximum combustion efficiency; and the change in forced draft effectuates a change in the stack damper to maintain the combustion chamber pressure the same.

It will also be noted that each of the control factors controls itself. In other words, a drop in steam pressure is compensated for by a change in combustion. With a given setting of fuel valve 6, if there should be any change in the fuel head, this will be immediately compensated for by a change in the opening of valve 6 so as to maintain a fuel input sufficient to insure the desired steam pressure; with a given fuel feed, a change in the forced draft air supply, for any reason, will automatically be compensated for by a change in the position of damper 35; the position of the furnace outlet damper 41 is being constantly shifted to compensate for minute changes in any of the factors determining the combustion chamber pressure.

It will be appreciated that the invention is of relatively simple construction, presenting little opportunity for the device to get out of order, and with a minimum of movable parts. It is therefore economical both in construction and operation, and the simplicity of its operation insures a functioning with a negligible amount of supervision.

There have heretofore been pointed out certain modifications which may be made in the specific embodiment herein described. These, however, are to be taken as exemplary, for the basic concept will find numerous other obvious modifications which fall within the scope of the invention as defined by the appended claims.

I claim:

1. In a furnace having control factors, the combination of a movable beam which controls the rate of fuel being fed to the furnace by actuating a motor which operates from a source of power which is independent of the medium being heated, said movable beam being motivated by two variable means, one of which is actuated directly by the change in the condition of the medium being heated and the other being actuated directly by the change in the pressure of the fuel being fed into the furnace, a second beam to control the supply of air being fed to the furnace by actuating a motor which operates from a source of power which is independent of the medium being heated, said second beam being motivated by two variable means, one of which is actuated directly by the pressure of the fuel being fed to the furnace and the other by the static pressure of air being fed to the furnace, a third movable beam which controls the size of the stack passageway by actuating a motor which operates from a source of power which is independent of the medium being heated, said beam being motivated by variable means, said variable means being actuated by a change in the pressure in the combustion chamber of the furnace, and a selective switch by the operation of which the control exerted by one or more of the said beams may be terminated.

2. In a furnace having control factors, the combination of a beam, the movement of which makes and breaks an electrical circuit thereby controlling the operation of a motor, the operation of which varies the position of a fuel valve, said movable beam being motivated by two variable means, one of which is actuated directly by the change in the condition of the medium to be heated and the other is actuated directly by the change in the pressure of the fuel being fed to the furnace, a second beam, the movement of which makes and breaks an electrical circuit and thereby controls a motor which varies the position of the damper in the air intake tunnel of the furnace, said second beam being motivated by two variable means, one of which is actuated directly by the pressure of fuel being fed to the furnace and the other by the static pressure of the air being fed to the furnace, a third beam, the movement of which makes and breaks an electrical circuit thereby controlling the operation of a motor, the operation of which varies the position of a damper in the stack of the furnace, said third beam being motivated by variable means which are actuated by a change in pressure in the combustion chamber of the furnace, a switch to shunt the above-mentioned electrical circuits thereby forming a new circuit and eliminating the control of all of the beams over the factors of combustion which they are designed to control, a second switch to connect the newly formed circuit with the source of power, and means to control the factors of combustion manually by means of the newly formed electrical circuit.

ROBERT LEWIS.